United States Patent [19]

Tani et al.

[11] 4,172,658

[45] Oct. 30, 1979

[54] IMAGE FORMING DEVICE OF COPYING APPARATUS OF THE VARIABLE DUPLICATE SIZE TYPE

[75] Inventors: Tatsuo Tani, Tokyo; Masao Kono, Yokohama, both of Japan

[73] Assignee: Ricoh Co., Ltd., Japan

[21] Appl. No.: 871,260

[22] Filed: Jan. 23, 1978

[30] Foreign Application Priority Data

Jan. 24, 1977 [JP] Japan .................................. 52-5797

[51] Int. Cl.$^2$ .............................................. G03B 27/76

[52] U.S. Cl. .......................................... 355/55; 355/71

[58] Field of Search ....................... 355/56, 51, 65, 66, 355/77, 71

[56] References Cited

U.S. PATENT DOCUMENTS

| | | | |
|---|---|---|---|
| 3,469,916 | 9/1969 | Sloan | 355/51 |
| 3,640,622 | 2/1972 | Shinozaki | 355/65 |
| 3,829,209 | 8/1974 | Buddendeck et al. | 355/66 X |
| 4,029,409 | 6/1977 | Spinelli et al. | 355/51 |
| 4,040,733 | 8/1977 | Satomi | 355/51 X |
| 4,080,057 | 3/1978 | Nakane et al. | 355/71 X |

*Primary Examiner*—Richard A. Wintercorn
*Attorney, Agent, or Firm*—McGlew and Tuttle

[57] ABSTRACT

In copying apparatus capable of producing a duplicate from an original differing in size from each other, a lens is moved when the size of a duplicate to be made from an original is to be changed. When the lens is moved along its optical axis, no change is caused to occur in the distribution of the volume of light passing through the lens for exposing an image forming surface to an optical image of the original. However, in case the original is set such that one side thereof is located on a reference position, the lens is moved in a direction perpendicular to its optical axis, with the result that a lack of uniformity will arise in the distribution of the volume of light thrown on the image forming surface through the lens. Shield means extending from outside the optical axis toward the optical axis is mounted between the original and the lens to cut off a portion of the light flux thrown on the image forming surface to thereby eliminate the lack of uniformity in the distribution of the volume of light thrown on the image forming surface which would otherwise occur.

5 Claims, 6 Drawing Figures

IMAGE FORMING DEVICE OF COPYING APPARATUS OF THE VARIABLE DUPLICATE SIZE TYPE

BACKGROUND AND FIELD OF THE INVENTION

This invention relates to copying apparatus capable of producing a duplicate of an original by enlarging or reducing the original, and more particularly to an image forming device of such copying apparatus which is provided with means for eliminating a lack of uniformity in the distribution of the volume of light thrown on the image forming surface.

DESCRIPTION OF THE PRIOR ART

In copying apparatus, an original is set or placed in an original placing or support station in such a manner that a forward end or one side, not the central line, thereof is used as a reference for positioning the original. That is, the forward end or one side of the original is brought into alignment with a reference line marked on the original placing station of the copying apparatus. In many cases, only one reference line is generally provided for use with originals and copy sheets of different sizes. In copying apparatus capable of varying the size of a duplicate produced from an original, particularly in the copying apparatus of the aforementioned type in which slit exposing is performed and where either one or the other of the illuminating means or the original is moved relation to the other for producing a scanning movement, the original is set such that a side thereof is disposed sideways of the direction of the scanning movement. The scanning movement of the illuminating means is thus aligned with the reference line. When a duplicate produced from an original of a different size from the original, the present practice is to move the lens of the exposing optical system along its optical axis and also in a direction perpendicular to the optical axis, so as to compensate for a displacement of the center line of a copy sheet which is caused by a change in the size of the copy sheet.

If the lens is moved in a direction perpendicular to the direction of the scanning movement of the illuminating means, the illuminating means will be unable to accomplish the object of compensating for the nonuniform distribution of the volume of light thrown on the original. Such an illuminating means is adapted to compensate for an inequality between the central portion and the peripheral portion of the original in the volume of light thrown thereon for exposing the image forming surface to these different portions of the original, which inequality occurs due to a characteristic of the lens. More particularly, there will be a loss of balance maintained, to compensate for this nonuniformity in the distribution of the volume of light for exposing the image forming surface to the original, between the distribution of the volume of light thrown on the original and the light volume reducing characteristic of the lens which has the effect of reducing the volume of light passing through the peripheral portion of the lens. The result of this is that, when a duplicate of a size differing from the size of the original is produced, an inequality in the distribution of the volume of light for exposing the image forming surface to the original will occur between the left portion and the right portion of an imaged formed on the image forming surface by exposing the latter to the original.

In FIG. 1 (*a*), an image 2 equal in size to an original 1 is formed by means of a lens 3. Since a side 1*a* of the original 1 is disposed on the reference position, a portion of the image at the side 1*a* of the original 1 which is projected through the lens 3 must be located at all times on a reference line 4 irrespective of the degree to which the original 1 is enlarged or reduced in producing the duplicate or the image 2. When an image 2' differing in size from the original 1 is produced, the lens 3 is moved in an X-direction along its optical axis and at the same time in a Y-direction which is perpendicular to the optical axis. After being thus moved, the lens 3' has an optical axis which is displaced upwardly in the figure and spaced by a distance y from the optical axis of the lens 3 positioned for producing the image 2 which is equal in size to the original 1.

Owing to the vignetting of light passing through the aperture of the lens 3 and the $\cos^4\theta$ relation with regard to the angle of incidence $\theta$ of light on the lens 3, the volume of light thrown through the lens 3 on the image forming surface to expose the latter to the original 1 is such that the volume of light is smaller in the peripheral portion than in the central portion of the original 1 as indicated by a curve 5 in FIG. 1 (*b*). Therefore, in order to obtain a uniformity in the distribution of the volume of light thrown on the image 2 as indicated by a line 6 in FIG. 1 (*b*) when the image 2 of the same size as the original 1 is produced, it is necessary that the original 1 be illuminated in such a manner as to have a distribution of the intensity of illumination such that the intensity of illumination is higher in the peripheral portion of the original than in the central portion thereof as indicated by a curve 7 in FIG. 1 (*b*).

To enable the above-mentioned characteristic to be better understood, FIG. 1 (*b*) shows the distribution of the volume of light or the intensity of illumination in relation to the positions of various elements of the optical system of FIG. 1 (*a*). The intensity of illumination or light intensity (%) is set forth along the horizontal axis, and the position of the original 1 corresponding to the lengthwise position of the slit for performing slit exposing is set forth along the vertical axis. The horizontal axis corresponds to the optical axis of the lens 3 and coincides with the center-line of the original 1.

When a duplicate differing in size from the original 1 is produced, the lens is moved both in the X-direction and the Y-direction as aforesaid, so that the optical axis is displaced by a distance y. Because of this, the balance maintained between the distribution curve 7 of the intensity of illumination on the original 1 and the light volume reducing characteristic of the lens 3 is lost, with the result that the distribution of the intensity of illumination on the formed image obtained when the image has a size differing from the size of the original 1 is indicated by a curve 8 in FIG. 1 (*b*) which shows that the intensity of illumination is much higher on one side of the optical axis than on the other side thereof. The results of experiments show that, whereas the distribution of the intensity of illumination on the formed image is more or less uniform when the duplicate produced is equal in size to the original, the difference in the intensity of illumination between portions of the formed image on the opposite sides of the optical axis becomes greater until an allowable limit level for the nonuniformity in the intensity of illumination is exceeded, as the difference in size between the original and the duplicate becomes greater.

Various proposals have been made to compensate for a nonuniformity in the distribution of the intensity of illumination on the formed image which occurs when the duplicate produced differs in size from the original. These proposals include; a method wherein a plurality of lamps for illuminating the original are arranged longitudinally of the exposing slit and the quantity of light emanating from each of these lamps is varied depending on the degree to which the original is enlarged or reduced in producing a duplicate; a method wherein at least part of the illuminating lamps, reflectors, etc. of the illuminating means is displaced or an additional shield member is inserted in the illuminating means so as to vary the effect of illumination in the longitudinal direction of the exposing slit in accordance with the degree to which the original is enlarged or reduced in producing a duplicate; and a method wherein a throttle member is mounted in the optical axis of the lens in a position close to the image forming surface and the degree of opening of the throttle member in the longitudinal direction of the exposing slit is varied in accordance with the degree to which the original is enlarged or reduced in producing a duplicate.

The methods hitherto proposed for compensating for a nonuniformity in the distribution of the intensity of illumination on the formed image can be worked theoretically. In actual practice however, difficulties are encountered in effecting compensation appropriately by any one of these methods. Moreover, since these methods call for moving a member compensating for the intensity of illumination in conjunction with a change in the degree to which the original is enlarged or reduced in producing a duplicate, the copying apparatus becomes complex in construction, its reliability in performance is reduced and its cost is increased.

SUMMARY OF THE INVENTION

This invention has as its object the provision of an image forming device of a copying apparatus of the variable duplicate size type which device obviates the aforementioned disadvantages of the prior art and eliminates the nonuniformity in the distribution of the light volume for exposing the image forming surface to an original.

The aforementioned object of the invention is accomplished by providing the image forming device with shield means which is interposed between the original and the lens of the device and extends from outside the optical axis of the lens toward the optical axis to cut off a portion of the light flex thrown on the image forming surface.

Accordingly an object of the present invention is to provide an imaging device for a copy making apparatus capable of forming an optical image which is reduced or enlarged in respect to an orginal to be copied comprising, an original support station having a reference position, means associated with said original support station for forming a distribution of light emanating from said support station, at least one lens associated with said support station for forming an optical image from the light rays emanating from the support station, said lens being mounted for movement toward and away from said support station along its optical axis and perpendicularly of its optical axis to respectively enlarge and reduce the size of the optical image, and light shield means disposed between said support station and said lens and blocking a portion of the light rays emanating from said support station whereby a uniformly symmetrical distribution of light is formed about the optical axis of the lens for producing the optical image for any positioning of said lens. A further object of the present invention is to provide a device which is simple in design, rugged in construction and economical to manufacture.

While a specific embodiment of the invention has been shown and described in detail to illustrate the application of the principles of the invention, it will be understood that the invention may be embodied otherwise without departing from such principles.

DETAILED DESCRIPTION OF THE PREFERRED EMBODIMENT

Figure 1A:
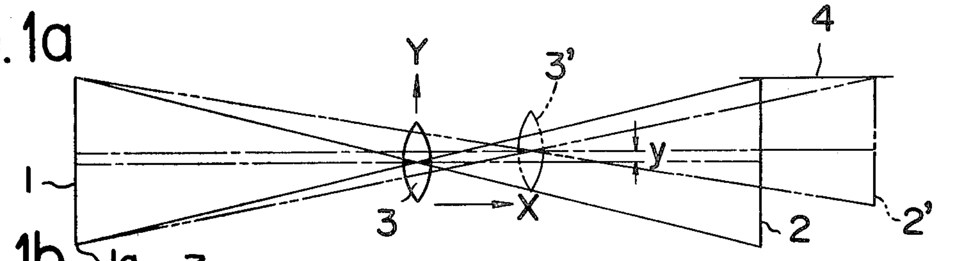
FIG. 1 is a view in explanation of the reason why a nonuniformity in the distribution of the intensity of illumination on the image forming surface occurs when the degree at which the original is enlarged or reduced by means of a lens in producing an original, FIG. 1 (*a*) being a diagrammatic representation of the image forming device and FIG. 1 (*b*) being a graph showing the distribution of the intensity of illumination and the distribution of the volume of light.
Figure 1B:
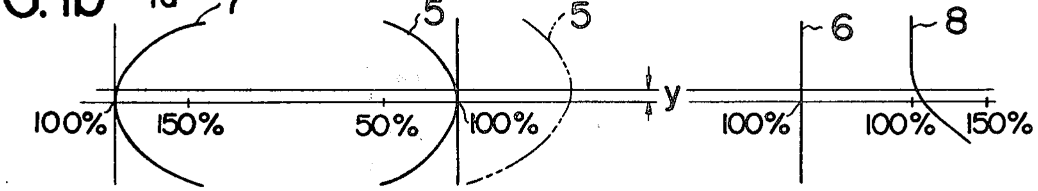
Figure 2:
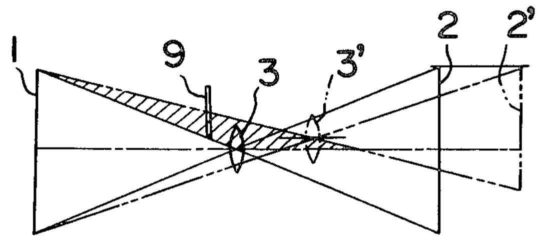
FIG. 2 is a diagrammatic representation of the image forming device according to the invention.

The invention will now be described with reference to a preferred embodiment shown in the accompanying drawings. In FIG. 2, there is shown a lens 3 through which an optical image of an original 1 is formed on a image forming surface 2 when a duplicate of the same size as the original 1 is to be produced. When it is desired to produce a duplicate of a size differing from the size of the original 1, the lens is moved both along its optical axis and in a direction perpendicular to the optical axis into a position 3'. The movement of the lens from the position 3 to the position 3' causes the optical path of a peripheral portion of the original 1 through the lens to be displaced greatly in the longitudinal direction of the slit as indicated by a hatched portion in the figure. Moreover, the intensity of illumination on the image forming surface 2' is higher on a portion thereof which corresponds to the peripheral portion of the original toward which the lens has moved, than on other portions. Stated differently, the portion of the image forming surface 2' corresponding to the hatched portion of the light flux is illuminated by a larger volume of light than the opposite portion thereof. In view of this phenomenon, a baffle plate 9 is provided as shield means which, although it does not affect the light flux passing from the original 1 through the lens 3 when a duplicate of the same size as the original 1 is produced, has the effect of cutting off a portion of the light flux passing from the peripheral portion of the original 1 through the lens 3' when the lens 3 has moved in a direction perpendicular to its optical axis for producing a duplicate of a size differing from the size of the original 1, to thereby cut off a portion of the light flux which has an increased intensity of illumination when producing a duplicate differing in size from the original. By this arrangement, it is possible to obtain a substantially uniform distribution of the intensity of illumination throughout the entire image forming surface 2'.

Figure 3:
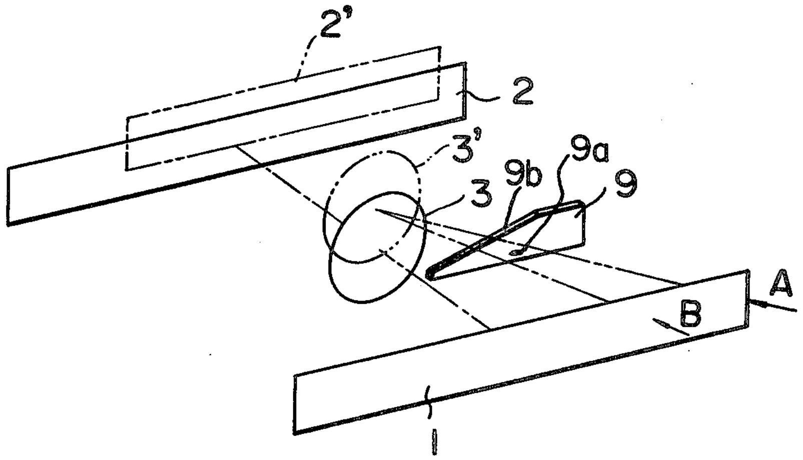
FIG. 3 is a diagrammatic perspective view of the device shown in FIG. 2.

The shape of the battle plate 9 is determined so that, when the lens 3 has been moved to the position 3' in which a duplicate of the desired degree of enlargement or reduction can be obtained from the original 1 as shown in FIG. 3, each portion of the effective area of the lens which is hidden by the baffle plate 9 as seen from the slit end or other portion of the original 1 corresponds to an increase in the intensity of illumination on a portion of the image forming surface 2' which corresponds to the respective portion of the original 1. The baffle plate is arranged in a position in which a portion of the light flux can be cut-off. For example, the baffle plate 9 is arranged so that when one sees the lens from a point on the original in a direction indicated by an arrow A, a hatched region or cord segment of the effective area of the lens is hidden by the baffle plate 9 as shown in FIG. 4 (*a*). When one sees the lens from a point of the original in a direction indicated by an arrow B, a hatched region or cord segment of the effective area of the lens is hidden by the baffle plate 9 as shown in FIG. 4 (*b*). If the quantity of light to be cut off at each of these points is determined, the shape of the baffle plate 9 can be determined.

When there are more than two degrees of enlargement or reduction at which a duplicate can be produced from the original 1, the shape and the position of the baffle plate 9 are selected such that a nonuniformity in the intensity of illumination for each rate of enlargement or reduction is within the range of allowable limits. The invention enables compensation for nonuniformity in the intensity of illumination to be effected when copies are produced from the original at more than two degrees of enlargement or reduction, by fixedly arranging a single baffle plate. The invention permits simplification of the construction of the apparatus and a reduction in cost to be achieved.

Figure 4A:
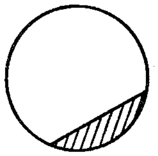
FIG. 4 is a view in explanation of the manner in which a portion of the light flux is cut off by the shield means, FIG. 4 (*a*) being a view as seen in the direction of an arrow A in FIG. 3 and FIG. 4 (*b*) being a view as seen in the direction of an arrow B in FIG. 3.
Figure 4B:
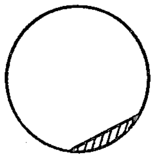

Baffle plate 9, for example, can include an included portion 9*a* which extends toward the axis of the lens 3, with an edge 9*b* which is parallel to a tangent of the lens 3, for blocking a cord segment as seen in FIGS. 4*a* and 4*b*.

It is to be understood that, by changing the shape of the baffle plate or adjusting its position, it is possible to widen the scope in which the baffle plate can have application.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a perferred embodiment of the invention is illustrated.

What is claimed is:

1. An image forming device of copying apparatus of the variable duplicate size type comprising:

an original placing station for placing an original thereon using one side thereof as a reference for positioning;

illuminating means for illuminating said original;

a lens for forming an optical image of said original on an image forming surface, said lens being capable of moving along its optical axis and in a direction perpendicular to the optical axis depending on the degree to which the original is enlarged or reduced in producing a duplicate; and shield means arranged between said original and said lens and mounted fixedly in a manner to extend toward the optical axis of the lens from outside the optical axis for cutting off a portion of the light flux incident on said lens.

2. An image forming device as claimed in claim 1, wherein said shield means comprises a baffle plate located with reference to an initial position of said lens such that the baffle plate is disposed in an area opposite to a side of the lens into which the lens is moved.

3. An imaging device for a copy making apparatus capable of forming an optical image which is reduced or enlarged in respect to an original to be copied, said device comprising:

an original support station with a reference edge position;

means associated with said original support station for forming light rays emanating from said support station;

an image forming surface spaced from said original support station;

a lens associated with said original support station for forming, on said image forming surface from the light rays emanating from said support station, an optical image including an image edge at a predetermined location on said image forming surface;

path defining means for defining an optical path between said support station and said image forming surface, said path defining means comprising said lens, a first part of said optical path being optically between said support station and said lens, and a second part of said optical path being optically between said lens and said image forming surface;

mounting means for relatively positioning said support station, said lens, and said image forming surface, said mounting means being adjustable to change the ratio of said first part of said optical path to said second part of said optical path to reduce or enlarge said optical image in respect to said original to be copied, said mounting means also offsetting at least one part of said path to maintain said image edge at said predetermined location when said image is either reduced or increased in size relative to said original;

and light shield means fixedly disposed at a predetermined location between said original support station and said lens to block a portion of the light rays emanating from said support station, the portion of said light rays blocked by said light shield being greater the greater the length of said first part of said optical path, whereby uniformly symmetrical distribution of light about the center of said lens is produced in the optical image formed on said image forming surface for any ratio of said first part of said optical path to said second part of said optical path.

4. An imaging device according to claim 3, wherein said mounting means moves said lens along said optical path to change the ratio of said first part to said second part and further moves said lens perpendicularly with respect to said path by a distance that is greater the greater the ratio of said first part to said second part, the direction of movement of said lens perpendicular to said optical path being in a direction generally towards said image edge location, said light shield also being located offset from said optical path in the direction perpendicular thereto and on the same side thereof toward which said lens is moved when the ratio of said first part of said optical path to said second part of said optical path is increased.

5. An imaging device according to claim 4, wherein said light shield means comprises a baffle plate extending toward the optical axis of said lens for blocking a cord segment of said lens when said lens is moved toward said baffle plate in a direction perpendicular to the optical axis of said lens, said baffle plate including an inclined portion having an edge extending parallel to a tangent of said lens.

* * * * *